United States Patent [19]

Lilley et al.

[11] Patent Number: 4,764,493

[45] Date of Patent: Aug. 16, 1988

[54] METHOD FOR THE PRODUCTION OF MONO-SIZE POWDERS OF BARIUM TITANATE

[75] Inventors: Edward Lilley, Ithaca; Raja R. Wusirika, Painted Post, both of N.Y.

[73] Assignee: Corning Glass Works, Corning, N.Y.

[21] Appl. No.: 874,460

[22] Filed: Jun. 16, 1986

[51] Int. Cl.$^4$ ................ C04B 35/46; C01G 23/00
[52] U.S. Cl. ................ 501/137; 501/136; 423/593; 423/598
[58] Field of Search ............. 501/134, 135, 136, 137; 423/598, 593

[56] References Cited

U.S. PATENT DOCUMENTS

| | | | |
|---|---|---|---|
| 4,293,534 | 10/1981 | Arendt | 423/598 X |
| 4,487,755 | 12/1984 | Arendt | 423/598 OR |
| 4,534,956 | 8/1985 | Arendt et al. | 423/598 OR |
| 4,606,906 | 8/1986 | Ritter et al. | 423/598 |
| 4,636,378 | 1/1987 | Pastor et al. | 501/137 X |
| 4,643,984 | 2/1987 | Abe et al. | 501/136 X |

FOREIGN PATENT DOCUMENTS

| | | | |
|---|---|---|---|
| 0141551 | 5/1985 | European Pat. Off. | 423/598 |
| 0530584 | 12/1940 | United Kingdom | 423/598 |

OTHER PUBLICATIONS

"An Aqueous Synthesis of Barium Titanate", by Steward S. Flaschen, Journal of American Ceramic Society, vol. 77, 1955, p. 6194.

"Ferroelectrics of Ultrafine Particle Size: I, Synthesis of Titanate Powders of Ultrafine Particle Size", Klara Kiss et al., Journal of the American Ceramic Society, Jun. 21, 1966, vol. 49, No. 6, pp. 291–295.

"Preparation of High-Purity Submicron Barium Titanate Powders", K. S. Mazdiyasni et al., Journal of the American Ceramic Society, Oct. 21, 1969, vol. 52, No. 10.

"Synthesis of $Nb_2O_5$-Doped $BaTiO_3$ with Improved Electrical Properties", K. S. Mazdiyasni and L. M. Brown, Journal of the American Ceramic Society—Discussions and Notes, Dec. 1972, pp. 633–634.

*Primary Examiner*—Mark L. Bell
*Assistant Examiner*—Karl Group
*Attorney, Agent, or Firm*—Gary H. Levin; Richard N. Wardell

[57] ABSTRACT

Mono-sized barium titanate powders which have high density and substantially pure stoichiometry are provided. The powders can be produced by reacting barium hydroxide with titanium dioxide in a protic solvent at a temperature of at least 100° C. for a period of at least 48 hours, or by reacting barium hydroxide with a titanium alkoxide in a protic solvent at a temperature of about the boiling point of the alkyl alcohol corresponding to the alkoxide for a period of at least about 240 hours.

8 Claims, No Drawings

METHOD FOR THE PRODUCTION OF MONO-SIZE POWDERS OF BARIUM TITANATE

BACKGROUND OF THE INVENTION

This invention relates to barium titanate powders, and particularly to such powders having high density and purity, uniformity of particle size, and controlled stoichiometry. The invention also relates to a method of producing such powders by reacting barium hydroxide with titania or a titanium alkoxide in a protic solvent.

Finely divided powders of barium titanate are useful in the production of dielectric components. Specifically, many dielectric components are prepared from such materials which, when sintered, form a hard and durable insulating element. Particularly useful for this purpose is barium titanate which is in particulate form of relatively uniform particle size of about 1000 angstroms (0.1 micron). The material is also desirably of high purity, high density, and closely controlled oxide composition. Barium titanate materials having these characteristics, especially those related to particle size and density, tend to sinter at lower temperatures, saving time and energy in the production of ceramic articles based thereon, and in the specific case of layered capacitors, providing greater strength per unit thickness of the layer and increased resistance to dielectric breakdown. Uniformity of particle size is also desirable to prevent localized exaggerated grain growth, which can result during sintering of the layers of a capacitor when the particle size distribution is not narrow. A typically large grains which can grow as a result can cause flaws that adversely effect strength and dielectric properties.

Producing barium titanate particles that have pre-calcining density approaching the theoretical density is also desirable, both in terms of production cost and product quality. In the production of ceramic articles, the oxide powders are normally molded or pressed into a desired shape, the so-called "green" shape, or are tape cast, followed by sintering at elevated temperatures to fuse the powders into a coherent and strong body. Heretofore, barium titanate powders having a density of only about 5.5 g/cc or less have been produced in chemical processes. If low-density particles such as these are pressed into a shape and sintered, excessive shrinkage of the material can occur, which can reduce the strength and increase the likelihood of cracking. Although the powders can be calcined after (or during) their initial production in order to shrink and densify them prior to the sintering step, the additional time and energy required for calcining undesirably adds to the production cost. Furthermore, calcining of powders often causes agglomeration of the primary particles into larger units of about 1 micron or greater. Although these agglomerates can be pulverized to smaller sizes, the pulverized particles are often irregular in shape. Such irregular-shaped particles tend to leave larger void spaces when packed or pressed in the green state, which can weaken the final ceramic body, increase tendency towards dielectric breakdown, and reduce the capacitance.

Barium titanate and other crystalline multi-oxides having the desired properties discussed above have heretofore been difficult to attain. Barium titanate, for example, has been prepared by reacting titanium isopropoxide and barium hydroxide in KOH solution at a ph of 11-14. S.S. Flaschen, *J. Amer. Chem. Soc.*, 77:6194 (1955). The cited reference does not define, however, the stoichiometry of the product (that is, the exact BaO/TiO ratio) or the purity of the product, in terms of whether the KOH can be successfully removed. In other procedures using titanium alkoxides and barium hydroxide, it has been difficult to control the BaO/TiO$_2$ molar ratio close to the desired unity value. See, for example, K. Kiss et al., *J. Amer. Cer. Soc.*, Vol. 49 (6), 291-302 (1966).

BaTiO has also been made by reacting alkoxides of barium and titanium, but this procedure has resulted in the formation of BaCO$_3$ as an impurity within the crystal structure. K.S. Mazdiyasni, et al., *J. Amer. Cer. Soc.*, Vol. 52 (10), (1969). It has been taught that the use of alkoxides results in the generation of BaTiO$_3$ in very fine crystallite form. K.S. Mazdiyasni, et al., *J. Amer. Cer. Soc.*, 55 (12) 633 (1972). However, the generation of barium alkoxide from barium metal itself, required by this process, is expensive and difficult. In other procedures directed to forming barium titanate, BaCO$_3$ and TiO$_2$ have been calcined together, in solid state, to generate BaTiO$_3$ in situ. This procedure, however, can leave impurities in the crystalline structure, and although the BaTiO$_3$ formed by the procedure is of high density, the grain size itself can be undesirably coarse. Further, the use of a high temperature calcining step, as reviewed earlier, is itself undesirable.

In none of these methods are highly dense, sub-micron particles formed without a calcination step or other high-temperature treatment. Accordingly, there remains a need for a method of economically producing barium titanate having the chemical purity and physical form, including density and particle size, required for the production of high quality ceramic materials such as dielectric components.

SUMMARY OF THE INVENTION

The present invention provides finely divided powders of barium titanate having a Ba/Ti molar ratio of 0.99-1.02 and a density of at least 5.7 g/cc. The particles have a mean primary particle size of about 0.09-0.2 micron with a geometric standard deviation of 30%. The present invention also provides two methods of producing the barium titanate powders. In the first method, barium hydroxide is reacted with titania having a particle size below about 0.1 micron in a protic solvent at a temperature of at least 100° C. for a period of at least 48 hours. In the second method of the invention, barium hydroxide is reacted with a titanium alkoxide in a protic solvent at a temperature of about the normal boiling point of the alkyl alcohol corresponding to the alkoxide for a period of at least 240 hours. A preferred embodiment of the second method is performed with titanium isopropoxide at a temperature of about 82° C. for a period of about two weeks.

It has been found that the methods of this invention produce high-density barium titanate powders without the need to calcine the powders to effect further densification. The powders are substantially spherical and in narrow particle size cuts, providing excellent packing, pressing, or tape casting capability for the final shaping/sintering steps in the production of hard, durable ceramic articles, particularly capacitors.

DETAILED DESCRIPTION OF THE INVENTION

According to the present invention, barium titanate powders of excellent density, particle size characteristics, purity, and composition are provided by reacting titanium dioxide (titania) or a titanium alkoxide with barium hydroxide in a protic solvent. It has been found that the methods of this invention, performed at the reaction conditions to be described herein, provide primary particles of barium titanate which achieve high density without undue particle growth, that is, growth to sizes greater than about 0.2 micron.

In the first method embodiment of the invention, titania is reacted directly with barium hydroxide at a temperature of at least about 100° C. for a period of at least about 48 hours. The titania is preferably anatase $TiO_2$ of fine particulate size not more than about 0.1 micron, preferably less than about 500 angstroms (A). Anatase titania generally reacts more quickly than the rutile form. Titania that is a mixture of the anatase and rutile forms can be used, but it is preferred that the mixture be predominantly (that is, at least about 75%) anatase. The use of titania reactant having a particle size not more than about 0.1 micron is preferred because, it has been found, titania of such property reacts more quickly than more coarse powders. A particularly preferred titania material is DeGussa Corporation's P-25 $TiO_2$, a titania soot of particle size less than about 300 A prepared by flame burning $TiCl_4$.

The titania is combined with the barium hydroxide in a protic solvent and heated. Examples of suitable protic solvents are water or organic alcohols such as isopropyl alcohol or n-butanol. Water is the preferred solvent. The reaction is performed at temperatures of 100° C. or above, and is generally performed in a closed reactor under autogenous pressure, although the reaction can be performed at the reflux temperature of the reaction mixture under atmospheric pressure when water or a higher-boiling alcohol is the solvent. Preferably, a reaction temperature of 100°-125° C. is used. The barium hydroxide should be protected from exposure to atmospheric $CO_2$ to prevent $BaCO_3$ formation, and therefore the reaction is preferably run in a closed system or under a blanket of inert gas. The reaction is continued for at least 48 hours, up to about 400 hours. Generally, the overall reaction rate depends on such factors as temperature, concentration and exact identity of reactants, and other factors as those skilled in the art will recognize. In any event, allowing the reaction to proceed for at least about 48 hours at a temperature of at least about 100° C. has been found to be important not only to complete the formation of barium titanate but also to obtain the desired density in the barium titanate powders so formed.

In the second method of the invention, barium hydroxide is reacted with a titanium alkoxide at a temperature of about the normal boiling point (that is, the boiling point at atmospheric pressure) of the alcohol corresponding to the alkoxide for a period of at least about 240 hours. The titanium alkoxides that can be used are the titanium salts or esters of lower alkyl (that is, $C_1$–$C_4$ alkyl) alcohols. Specific examples are titanium isopropoxide (tetraisopropyl titanate) and titanium ethoxide (tetraethyl titanate), with the former being preferred. Use of the alkoxides generally provides titania in the reaction mixture with an effective particle size within the limits described herein. For example, in a suspension of hydrolyzed titanium isopropoxide, generally formed spontaneously by the addition of titanium isopropoxide to the solvent, the titania itself is in extremely fine amorphous particle size of about 100 A or below.

In the conduct of this reaction, the titanium alkoxide is combined with the barium hydroxide in a protic solvent, such as described earlier, and heated. When the titanium alkoxide contacts the solvent, it rapidly decomposes to titania and the alcohol. The reaction is preferably performed in a closed system, most preferably under a blanket of inert gas to prevent $BaCO_3$ formation, at a temperature of about the normal boiling point of the alkanol, preferably within 5°–10° C. of the boiling point. The reaction is conducted for at least about 240 hours, and more preferably for about 336 hours (two weeks). In a preferred reaction, the titanium alkoxide is titanium isopropoxide, which releases isopropyl alcohol and the titania reactant itself when added to the solvent, which is most preferably water. The reaction is conducted at about 82° C., the approximate boiling temperature of isopropyl alcohol, for about two weeks.

Both reaction schemes of this invention provide finely divided barium titanate material. The use of an alkoxide provides slightly finer barium titanate particles than does use of the titania itself, although the latter provides particles of more uniform size. Overall, the use of the titania soot is preferred.

In both reaction schemes, a molar excess of barium relative to titanium is maintained. Preferably, the reaction is conducted with a molar excess of barium hydroxide, relative to the titanium compound, of at least 3%. An excess of up to 10% or greater can be employed, but the use of more than about 1.1 moles of barium hydroxide per mole of titanium compound can present difficulty in removing excess barium hydroxide at the completion of the reaction, during the washing and recovery of the powders. Although the concentration of the reactants in the reaction mixture is not particularly critical, the barium hydroxide concentration should be sufficiently high to maintain a pH of at least about 11 unless another pH adjuster, such as KOH, is used. It is preferred, however, that the pH be maintained solely through the barium hydroxide concentration.

At the completion of the reaction, the resultant crystalline $BaTiO_3$ will generally be in the form of a fine particulate dispersion or suspension in the reaction medium. The particles are recovered by conventional means, such as filtration or centrifugation, followed by washing. As during the reaction itself, $CO_2$ is preferably excluded from the recovery environment to prevent formation of $BaCO_3$. The washing step is necessary to remove excess, unreacted, barium hydroxide from the powders, and can be accomplished using standard techniques with four weight parts of water per weight part of the powder. Generally, two washings are sufficient to remove the excess material. An additional wash using isopropl alcohol can be performed when it is contemplated that the powder product will be dispersed in an organic liquid in future use in the production of ceramic articles.

The barium titanate powders formed by the process of this invention have an unagglomerated, primary particle size of about 0.09–0.1 micron. More specifically, the mean (number) particle diameter is about 0.09–0.1 micron with a 30% geometric standard deviation. The powder particle size can be measured by transmission electron microscopy, by which the particle size itself, and the particle morphology and any agglomeration, can be observed. Mean particle sizes up to about 0.2 micron, with the same particle size distribution, can be obtained by "seeding" the reaction mixture with pre-formed barium titanate particles. The pre-formed particles provide a reaction site for the combination of barium hydroxide and titanium compound, and the pre-formed particles are enlargened to the substantial exclusion of growth of new powder particles.

In general, the barium titanate powders of the invention, as produced by the methods herein described, have a combination of physical and chemical characteristics not obtained heretofore in barium titanate powders. The reaction conditions specified herein provide barium titanate material, in particulate form, having a density of at least 5.7 grams per cubic centimeter (g/cc), preferably 5.8–5.85 g/cc, without having been calcined. (As used herein, "calcining" means heating a material to a temperature which is sufficiently high to substantially eliminate volatiles and at which the material first begins to lose its original porosity and surface area. In the case of barium titanate, the temperature at which this loss of porosity and surface area begins to occur is about 500° C.) Consequently, the powders of the invention can be used directly in the formation of a ceramic article without the need for an intermediate calcining step at the elevated temperatures normally required to densify a ceramic prior to "green" state packing. The barium titanate of the present invention is sufficiently dense to provide particles of the material which themselves have eXcellent green state packing density without the need for calcining. Density of the particle material can be determined by picnometry.

The powders of the invention are further characterized by a surface area of about 6–15 square meters per gram ($m^2/g$), with a surface area of about 12 $m^2/g$ being typical for a mean powder size of about 0.1 micron. After washing, the barium titanate material has a Ba/Ti molar ratio of about 0.99–1.02, preferably about 1.0–1.01, and is substantially free of $BaCO_3$ and unreacted $TiO_2$, having less than 0.1 mole percent and more usually less than 0.05 mole percent of each of these compounds. The barium titanate formed by the methods of the invention also exhibits exceptional stability. That is, the washing of the powder, by which excess barium hydroxide is removed, does not adversely affect the Ba/Ti molar ratio of the final product, and the powder can retain a ratio of at least about 0.99 despite repeated washing. It is to be understood that the ores from which barium is derived normally contain minor amounts of strontium as an impurity, but the presence of this impurity does not effect the properties of the barium titanate produced therefrom. Accordingly, reference herein to barium hydroxide or barium titanate includes the minor amounts of the analogous strontium compounds inherently present, and strontium is deemed equal to barium for purposes of the Ba/Ti molar ratio determination.

Barium titanate powders are most preferably "doped" with other transition metals or other alkyl or alkaline earth metals to produce materials having superior dielectric properties for capacitors. Doping of barium titanate powders which are formed from titania soot can be accomplished by including one or more dopants in the reaction mixture itself, which dopants become incorporated in the final barium titanate composition. For example, in the first reaction scheme described above, strontium hydroxide can be substituted for some of the barium hydroxide in the reaction with titania soot, resulting in a solid solution of $Sr/BaTiO_3$. It has been determined by x-ray diffraction that a single-phase doped barium titanate can be produced even where up to 30 mole percent of the barium compound has been replaced by the strontium compound.

When the titania is incorporated into the reaction scheme in the form of a titanium alkoxide, doping can be accomplished by substituting a liquid alkoxide of the desired dopant for some of the titanium alkoxide in the reaction mixture. Dopants which can be added in this manner include, for example, niobium, zirconium, and tin. The titanium alkoxide and dopant-metal alkoxide are refluxed together prior to their addition to the reaction mixture. Refluxing forms a double oxide of the titanium and dopant which can then be combined with the barium hydroxide to produce uniformly doped barium titanate. It has been found that merely mixing the titanium alkoxide with the dopant-metal alkoxide is not sufficient. For example, when titanium isopropoxide and zirconium n-propoxide are merely admixed together, followed by reaction with barium hydroxide according to the reaction scheme discussed above, the resulting powder is a physical mixture of barium titanate and barium zirconate. Where, however, the titanium and zirconium alkoxides are first refluxed together, a solid solution of $Zr/BaTiO_3$ is formed, as verified by X-ray diffraction.

It is also possible to surface dope barium titanate particles that have been previously prepared. For example, niobium ethoxide in isopropyl alcohol can be mixed with barium titanate powder to form a slurry which is then slowly hydrolyzed by exposure to moist air, resulting in the formation of a surface coating of niobium oxide on the pre-formed barium titanate particles.

The dopant materials which replace either barium or titanium in solid solution are considered to be equivalent to the replaced atoms for purposes of determining the Ba/Ti molar ratio discussed above.

The following examples are intended to be illustrative, but not limiting, of the present invention.

EXAMPLE 1

In the following comparative reactions, a standard reaction batch used was as follows:

| | |
|---|---|
| $TiO_2$ (mean particle size 240A; 85% anatase/15% rutile - DeGussa Corp.) | 20 grams |
| $Ba(OH)_2.8H_2O$ (Fisher Chemical Corp.) | 81 grams |
| Distilled Water | 115 grams |

The indicated amount of barium hydroxide was weighed out directly into each of several 250 ml polyethylene bottles, and 115 ml of boiling hot water (boiled to removed dissolved $CO_2$) was then added rapidly to each bottle and the bottle sealed. The bottles were maintained in an oven set at 103° C. until all the barium hydroxide had dissolved, after which the $TiO_2$ was added rapidly to each bottle through a funnel. The bottles were resealed and placed in the oven at the reaction temperature of 103° C. The reaction was allowed to proceed for different periods of time for different bottles. At the completion of the reaction for any particular bottle, the bottle was removed from the oven and centrifuged hot at 7000 rpm for 5 minutes, after which the decant was poured off, leaving behind the product powder. The bottle was then filled with distilled water (room temperature) and the powder dispersed in the water by rolling for about an hour to dissolve unreacted barium hydroxide. The bottle was again centrifuged for 10 minutes at 7000 rpm, and the liquid decanted. The powder was then washed twice with isopropyl alcohol using the same centrifuging/decanting procedure, followed by drying the powder product in a vacuum oven at 60° C. The properties of the barium titanate material, as a function of reaction time, are shown in the following table. It can be seen that the material density, primary particle size, and Ba/Ti molar ratio reach the standards of this invention at a minimum reaction time of about 48 hours.

|  | Reaction Time (Hours) | | | |
| --- | --- | --- | --- | --- |
|  | 3 | 5 | 10 | 24 | 48 | 336 |
| Density (g/cc) | 5.5 | 5.52 | 5.63 | — | 5.71 | 5.83 |
| Primary particle size (micron) | 0.058[a] | 0.052[b] | 0.054 | 0.082 | 0.093 | 0.091 |
| BET surface area (m$^2$/g) | 22.2 | 18.2 | 16.5 | 14.5 | 12.0 | 12.0 |
| Ba/Ti molar ratio[c] | 0.90 | 0.96 | 1.02 | 1.025 | 1.015 | 1.01 |

[a] measured at 2 hours
[b] measured at 4 hours
[c] measured to an accuracy of ±0.5%

EXAMPLE 2

To a first 72 ml quantity of distilled water were slowly added 286 g of titanium isopropoxide, forming a titania slurry. To a second 72 ml quantity of distilled water were added 323 g of barium hydroxide powder, and the resulting mixture was heated to 80° C. to dissolve the barium hydroxide. This mixture was then combined with the titania slurry to form a reaction mixture which was sealed in a polytetrafluorethylene bottle. This procedure was repeated to provide four such reaction bottles, which were placed in an oven at a reaction temperature of about 80° C. The reaction was allowed to proceed for each bottle for a different period of time, as shown in the table below. At the completion of the reaction period for any particular bottle, the bottle was removed from the oven and the resulting powder recovered using the procedure described in Example 1. The properties of the barium titanate material, as a function of reaction time, are shown in the following table.

|  | Reaction Time (Hours) | | | |
| --- | --- | --- | --- | --- |
|  | 4 | 24 | 120 | 336 |
| Density (g/cc) | 5.15 | 5.44 | 5.63 | 5.79 |
| BET Surface Area (m$^2$/g) | 25.8 | 25.0 | 19.2 | 14.4 |
| Ba/Ti Molar Ratio (±0.5%) | 0.996 | 1.001 | 1.01 | 1.02 |
| Primary Particle size (micron) | 0.037 | 0.052 | — | 0.097 |

We claim:

1. A method of producing BaTiO$_3$ powders comprising reacting barium hydroxide with titania having a particle size not greater than 0.1 micron, said reaction being conducted in a protic solvent at a temperature of at least 100° C. for a period of at least 48 hours to produce BaTiO$_3$ having a density of at least 5.7 g/cc.

2. The method of claim 1 wherein the protic solvent is water.

3. The method of claim 2 wherein the titania is at least 75% by weight anatase titania.

4. The method of claim 2 wherein the reaction temperature is 100°–125° C.

5. A method of producing BaTiO$_3$ powder comprising reacting barium hydroxide with a titanium alkoxide in a protic solvent at a temperature of about the normal boiling temperature of the alcohol corresponding to the alkoxide for a period of at least about 240 hours to produce BaTiO$_3$ having a density of at least 5.7 g/cc.

6. The method of claim 5 wherein the protic solvent is water or isopropyl alcohol.

7. The method of claim 5 wherein the alkoxide is titanium isopropoxide or titanium ethoxide.

8. The method of claim 6 wherein the alkoxide is titanium isopropoxide and wherein the reaction is conducted at a temperature of about 80°–82° C.

* * * * *